US008626430B2

(12) United States Patent
Dicke et al.

(10) Patent No.: US 8,626,430 B2
(45) Date of Patent: Jan. 7, 2014

(54) SYSTEM AND METHOD OF PATH POINT REDUCTION

(75) Inventors: Ronald Anthony Dicke, Ottawa (CA); Ngoc Bich Ngo, Nepean (CA); Yongming Zhang, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 804 days.

(21) Appl. No.: 12/238,703

(22) Filed: Sep. 26, 2008

(65) Prior Publication Data

US 2010/0082235 A1    Apr. 1, 2010

(51) Int. Cl.
*G01C 21/00* (2006.01)
*G01C 21/34* (2006.01)

(52) U.S. Cl.
USPC .......................................... 701/206; 701/211

(58) Field of Classification Search
USPC ........................................................ 701/206
See application file for complete search history.

(56) References Cited

U.S. PATENT DOCUMENTS

| | | | | |
|---|---|---|---|---|
| 4,796,189 A | * | 1/1989 | Nakayama et al. | 701/430 |
| 6,266,614 B1 | * | 7/2001 | Alumbaugh | 701/211 |
| 6,952,180 B2 | * | 10/2005 | Jonsson et al. | 342/357.51 |
| 7,158,878 B2 | | 1/2007 | Rasmussen et al. | |
| 2002/0120396 A1 | * | 8/2002 | Boies et al. | 701/209 |
| 2002/0183922 A1 | | 12/2002 | Tomasi et al. | |

FOREIGN PATENT DOCUMENTS

| | | |
|---|---|---|
| WO | 0214893 A1 | 2/2002 |
| WO | 2008096376 A1 | 8/2008 |

OTHER PUBLICATIONS

European Search Report for EP Application No. 08165207.5 mailed Mar. 5, 2009.

* cited by examiner

*Primary Examiner* — Hiep V Nguyen
(74) *Attorney, Agent, or Firm* — Gowling Lafleur Henderson LLP

(57) ABSTRACT

A method of reducing waypoints representing a path defined along a route between two endpoints. The route includes a set of critical points including the endpoints and any decision points of the route intermediate the two endpoints. One or more waypoints of the path that are distal each critical point are eliminated, while retaining waypoints that are proximal each critical point. This enables the computation of a reduced waypoint path which provides accurate route-following in the vicinity of each critical point of the route.

23 Claims, 7 Drawing Sheets

SYSTEM AND METHOD OF PATH POINT REDUCTION

CROSS-REFERENCE TO RELATED APPLICATIONS

This is the first application filed in respect of the present technology.

TECHNICAL FIELD

The present disclosure relates generally to location based services for wireless communications devices and, in particular, to techniques for reducing the waypoints of a path for display on a wireless communications device.

BACKGROUND

Wireless communications devices such as the BlackBerry™ by Research in Motion Limited enable users to download map content from web-based data sources such as BlackBerry Maps™, Google Maps™ or Mapquest™. Downloaded map content is displayed on a small LCD display screen of the wireless communications device for viewing by the user. The user can pan up and down and side to side as well as zoom in or out. Due to the small display on the device and due to the limited over-the-air (OTA) bandwidth, there is a need to optimize the delivery and handling of the map data.

With the increasing availability of wireless communications devices having onboard Global Positioning System (GPS) receivers for providing location-based services (LBS), the efficient delivery and handling of map data is increasingly important.

When the user requests a route between starting and destination locations (that is, the end-points of the route), the server generates a path represented by a series of waypoints between the two user-defined end-points, as well as a set of directions (for example "driving instructions") for following the route. Typically, the directions are associated with "decision points" that are located along the route, for example at each intersection or junction where the user must make a turn or take one of two or more possible roads.

For the purposes of understanding the present description, the "route" refers to a sequence of roads, highways, etc. that the user must follow in order to travel between the starting and destination points. The route also provides a context for directions intended to guide the user along the route, and decision points. A "path" is an abstract representation of the route, which is intended to be graphically superimposed over a map display of all or part of the route, so as to assist the user in identifying and following the route. Typically, the path is represented by a set of waypoints distributed along the route. Representation of the path as a set of waypoints enables simple computation and storage of the path, and allows the path to be overlayed onto the map display with proper scaling. Normally, the set of waypoints defining the path will be downloaded to the wireless communications device as part of the data file containing the route information. In order to reduce demand for processor resources on the wireless communications device, the path is normally displayed as a series of straight line segments (otherwise known as vectors) extending between successive waypoints. The waypoints themselves will not normally be shown on the display.

A limitation of the conventional methods is that if the path is very long, the number of waypoints may become too large to send over-the-air in a timely fashion. Therefore, if the path contains more than a maximum number of waypoints which can reasonably be transmitted over-the-air in a timely fashion, some waypoints must be removed to reduce the total number of waypoints. A disadvantage of this approach is that reducing the number of waypoints also has the effect of reducing the accuracy with which the path traces the route on a map display. While the waypoints may be accurately "pinned" to the actual route shown on the map display, the straight line segments of the path display will tend to deviate from the route, and this deviation will tend to increase as the curvature of the route (roads) and/or the separation between the remaining waypoints increases.

Many generalization algorithms are known which are intended to eliminate waypoints while minimizing an overall deviation of the path from the desired route. However, a route through an area with many roads (such as within a city, or at a highway interchange, for example) presents a unique problem, since it is desired that the path follow the actual roads traversed by the route as exactly as possible, even with a reduced set of waypoints. An algorithm that minimizes the overall error of the path, on the other hand, may produce a path that lies close to a road traversed by the route, but not actually on it, and this situation may persist for much of the route between the starting point and the destination point.

FIGS. 1a-b, are maps generated by a well-known mapping service, which illustrate this problem. FIG. 1a shows a portion of a route 2 in which the user is directed to exit "Moreno Valley Freeway" 60 and merge onto "Riverside Freeway" 91. The actual route 2 is shown in dashed line. However, as can be seen in FIG. 1a, the path 4, shown in solid line, deviates markedly from the route 2, due to the reduced set of waypoints used to define the path 4. FIG. 1b shows a portion of a route 2 within a city, in which the user is directed from $1^{st}$ avenue to the Cabrillo Freeway 163 via a series of access lanes and on-ramps. As in FIG. 1a, the actual route 2 is shown in dashed line. The path 4, shown in solid line, deviates markedly from the route, due to the reduced set of waypoints. In this case, the deviation is so severe that the path display provides little useful guidance to the user, even though the overall error of the path—measured along the entire length of the route—has been minimized.

FIG. 2 illustrates another example, in which a pair of decision points 19 and 20 are shown along a route in which the user is guided onto "Berliner Ring" via an on-ramp. However, the path fails to follow the on-ramp, and even misses one of the decision points (19, 20) altogether, due to the reduced set of waypoints.

BRIEF DESCRIPTION OF THE DRAWINGS

Features and advantages of the present technique will become apparent from the following detailed description, taken in combination with the appended drawings, in which.

It will be noted that throughout the appended drawings, like features are identified by like reference numerals.

DETAILED DESCRIPTION

The present technology provides, in general, a method of reducing waypoints representing a path while ensuring that the path accurately follows a route in the vicinity of decision points.

Thus, an aspect of the present technology provides a method of reducing waypoints representing a path defined along a route between a starting point and a destination, the path including one or more decision points. In accordance with the present method, the total number of waypoints representing the path is reduced by eliminating one or more waypoints that are distal each decision point of the path, while retaining waypoints that are proximal each decision point.

Another aspect of the present technology is a computer program product comprising code adapted to perform the steps of the foregoing method when the computer program product is loaded into memory and executed on a processor of a server hosting the wireless communications device.

Yet another aspect of the present technology is a wireless communications device comprising a radiofrequency transceiver for receiving data comprising waypoints representing a path defined along a route between two endpoints, the route including a set of critical points including the endpoints and any decision points of the route intermediate the two endpoints and a processor coupled to memory for eliminating one or waypoints of the path that are distal each critical point, while retaining waypoints that are proximal each critical point.

Yet another aspect of the present technology is a method of displaying a navigation path on a map displayed on a display of a wireless communications device. The method involves steps of sending a request for the navigation path to a server and receiving from the server a reduced point path representing the navigation path for a route between two endpoints the route including a set of critical points including the endpoints and any decision points of the route intermediate the two endpoints, wherein the reduced point path is generated by eliminating one or more waypoints of the path that are distal each critical point while retaining waypoints that are proximal each critical point.

Figure 3:
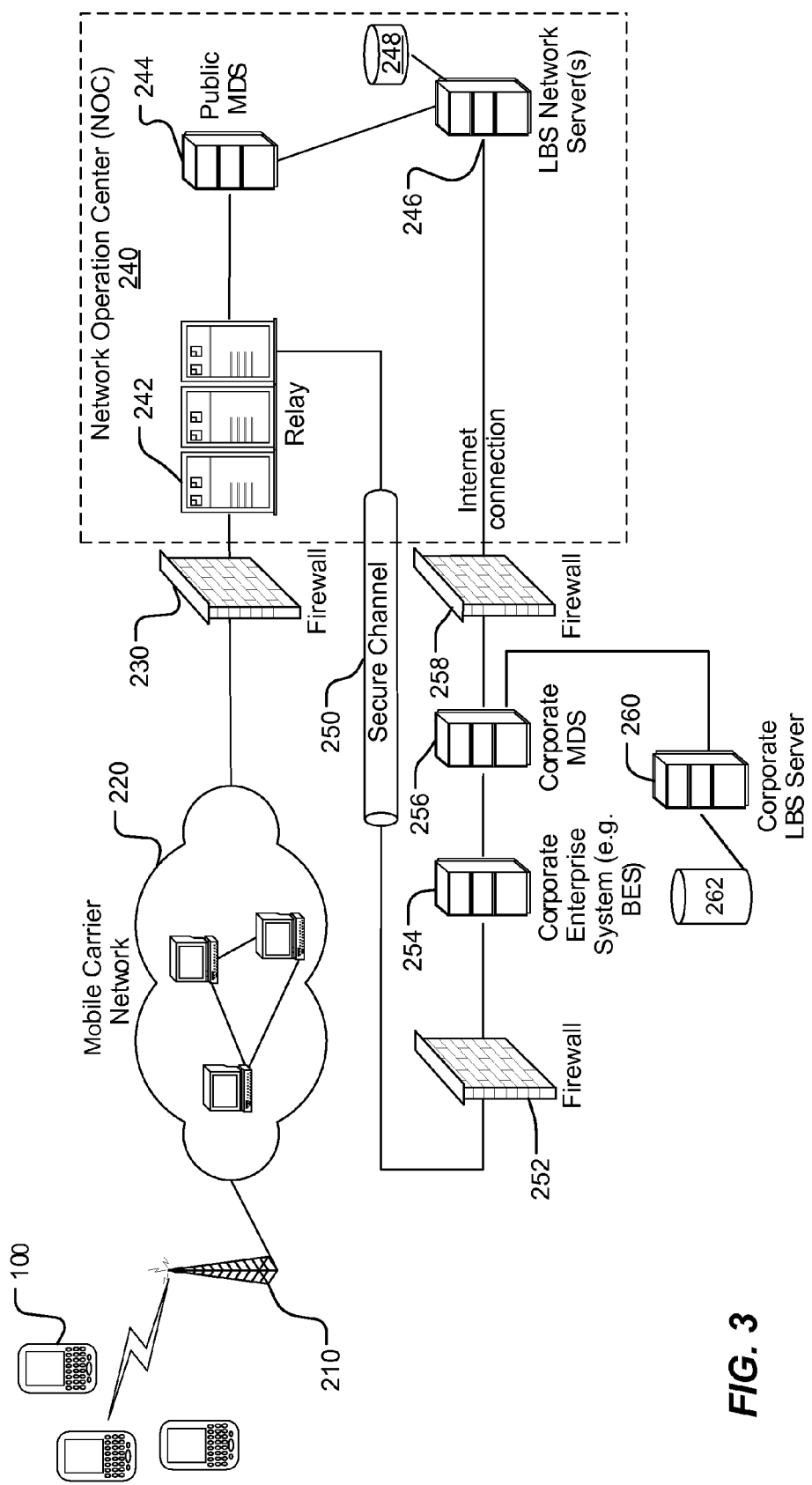
FIG. 3 is a schematic depiction of a representative network enabling wireless devices to access location-based services, in which the present technique may be employed.

FIG. 3 schematically illustrates a representative network in which the present technique may be employed. As may be seen in FIG. 3, one or more wireless communications devices 100 communicate wirelessly with a mobile carrier network 220 via one or more base station towers 210. The wireless communications devices can be wireless handhelds such as the BlackBerry™ from Research in Motion Limited, but could also be other devices with GPS capabilities such as cellular phones, wireless-enabled PDAs, wireless-enabled laptops, etc.

Figure 1A:
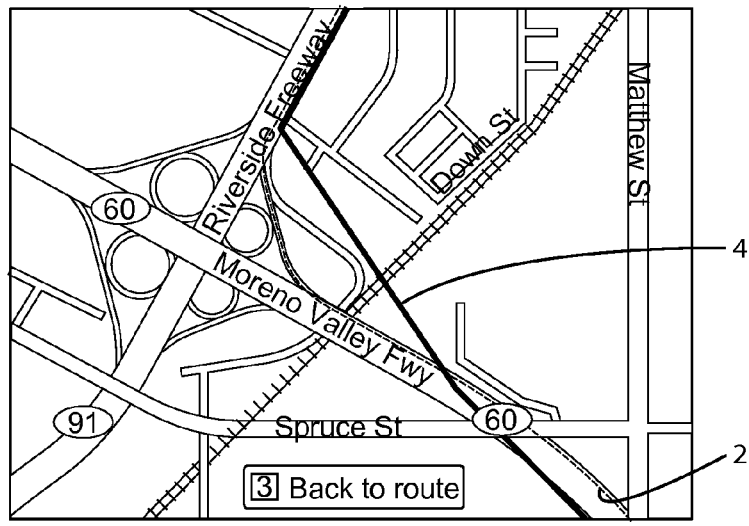
FIGS. 1a and 1b are images of a map display showing a path computed using conventional methods.
Figure 1B:
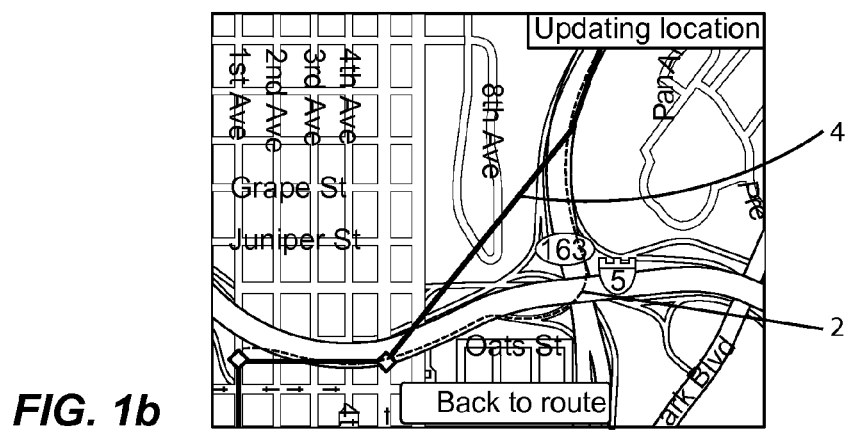
Figure 2:
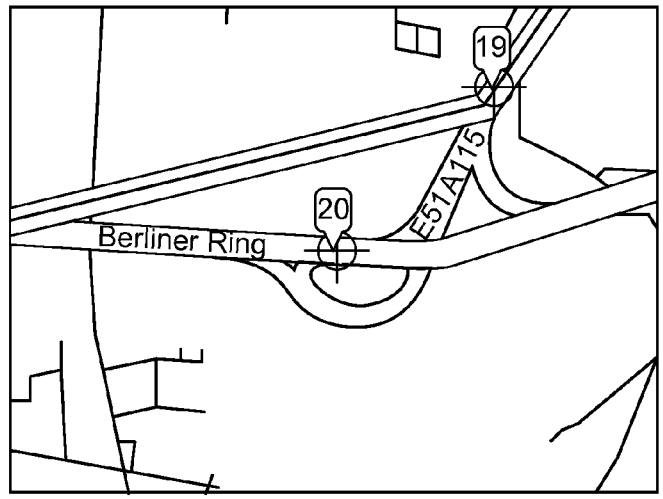
FIG. 2 is an image of map display showing a portion of a route including a pair of decision points and a path computed using conventional methods.

As shown by way of example in FIG. 3, both private and public location-based services (LBS) can be accessed via the mobile carrier 220. For example, public LBS can be accessed via the Network Operations Center (NOC) 240 via a firewall 230. NOC 240 includes a relay 242, a public MDS 244 (e.g. BlackBerry Mobile Data System™) which is connected to one or more LBS Network Servers 246 (each having their own LBS database 248). The relay 242 is also connected via a secure channel 250 via a firewall 252 to a Corporate Enterprise System (e.g. BES) and a Corporate MDS Server 256 which is, in turn, optionally connected to a Corporate LBS Server 260 (and its database 262). The Corporate MDS Server 256, in the example shown in FIG. 1, also has an Internet connection via another firewall 258 to the LBS Network Server 246.

Wireless communications devices 100 issue requests for LBS (including map data) to relay 242. These requests are passed via the secure channel 250 through firewall 252 to the corporate enterprise server 254 and corporate mobile data system (MDS) server 256. The LBS request is then passed via firewall 258 to a public location-based service (LBS) server 246 which provides location-based services (LBS) to handle the request. The network may include a plurality of LBS servers where requests are distributed and processed through a load distributing server. The LBS data may be stored on this network server 246 or in a database 248. Private corporate data stored on corporate LBS server(s) 260 may be added to, or superimposed on, the public data using corporate enterprise system 254 and corporate MDS server 256 on the secure return path to the wireless device 100. Alternatively, where no corporate servers are provided, the LBS request from the wireless device 100 may be passed via relay 307 to the public MDS server 244, which sends the request to the public LBS server 246 providing location-based services in response to the request.

Among other things, the location-based services may include mapping and routing services, including the calculation of a route between starting and destination points provided in the request, selection of decision points and associated steering directions to guide the user along the route, and determination of a path along the route, which enables the route to be highlighted on a map display showing all or part of the route. As noted above, the path will normally be represented as a series of waypoints, which can be downloaded to the wireless communications devices 100 to facilitate display. This technology can be used in conjunction with turn-by-turn GPS navigation software which not only plots the path to be taken but also shows the real-time position of the device along the path (or elsewhere on the map if the device has diverted off the navigation path).

Figure 4:
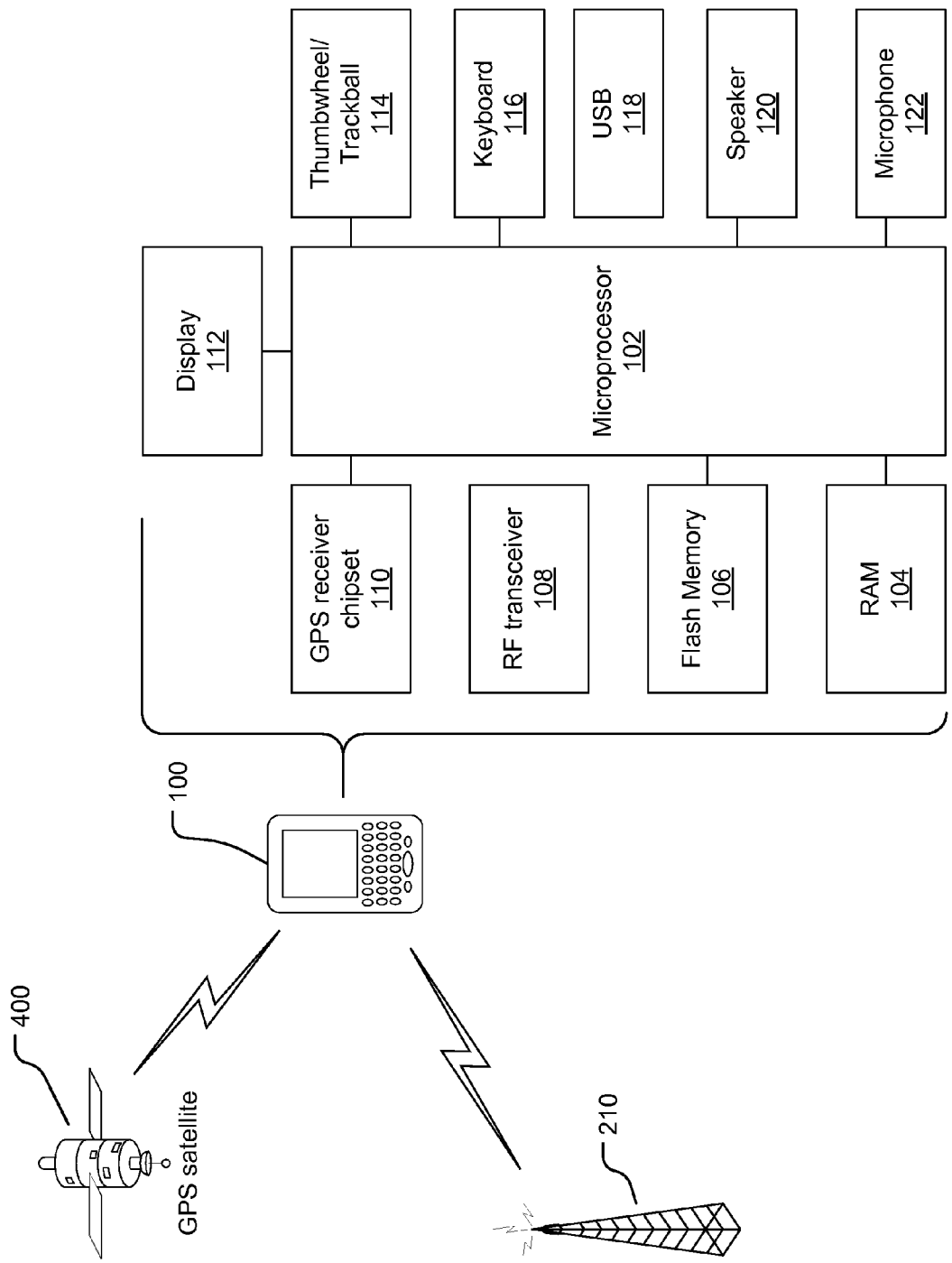
FIG. 4 is a block diagram depicting principal components of a GPS-enabled wireless communications device usable in the network of FIG. 1.

FIG. 4 is a block diagram illustrating principal components of a GPS-enabled wireless communications device 100. It should be expressly understood that this figure is intentionally simplified to show only certain components; the device 100 of course includes other components beyond what are shown in the figures. The device 100 includes a microprocessor 102 (or simply a "processor") which interacts with memory in the form of RAM 104 and Flash Memory 106, as is well known in the art. The device 100 includes an RF transceiver 108 for communicating wirelessly with base stations 210. The device 100 includes a GPS receiver chipset 110 for receiving GPS radio signals transmitted from one or more orbiting GPS satellites. In terms of input/output devices or user interfaces, the device 100 typically includes a display 112 (e.g. a small LCD screen), a thumbwheel and/or trackball 114, a keyboard/keypad 116, a USB 118 or serial port for connecting to peripheral equipment, a speaker 120 and a microphone 122. In lieu of the keyboard/keypad, the device 100 may have a touchscreen for receiving user input. Map and path data are received through the RF transceiver 108. Controlled by the processor 102, the map and path data are then stored in RAM 104 and displayed on display 112. In order to reduce demand on processor resources, the processor 102 will render the path as a set of straight line segments (or vectors) extending between successive waypoints. Typically, the waypoints and vectors are not annotated on the map display.

In order to reduce the amount of data that must be transferred to the wireless communications device 100, the public LBS server 246 implements an algorithm for reducing the number of waypoints representing the path. In accordance with the present technique, this algorithm is designed to preferentially eliminate waypoints that are remote (that is, distal) from each of the critical points of the route. In this case, the term "critical points" should be understood to be a generic reference to the two endpoints and any decision points of the route between the two endpoints. Thus, for example, the route 2 may be divided into segments, including proximal segments 6 encompassing each critical point (endpoint or decision point) of the route, and distal segments 8 extending between adjacent proximal segments, as may be seen in FIG. 5a. Waypoints can then be eliminated from each of the distal segments 8, while preserving the waypoints encompassed by each proximal segment 6.

Figure 5A:
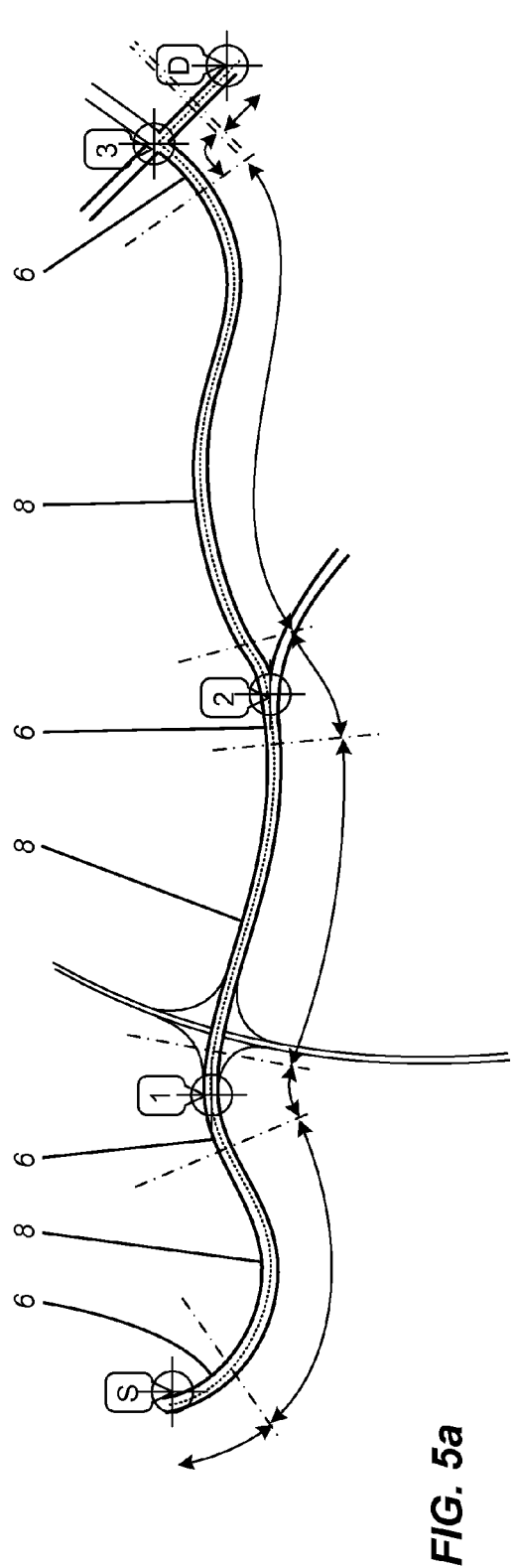
FIGS. 5a and 5b schematically illustrate computation of a reduced waypoint path according to an embodiment of the present technique.
Figure 5B:
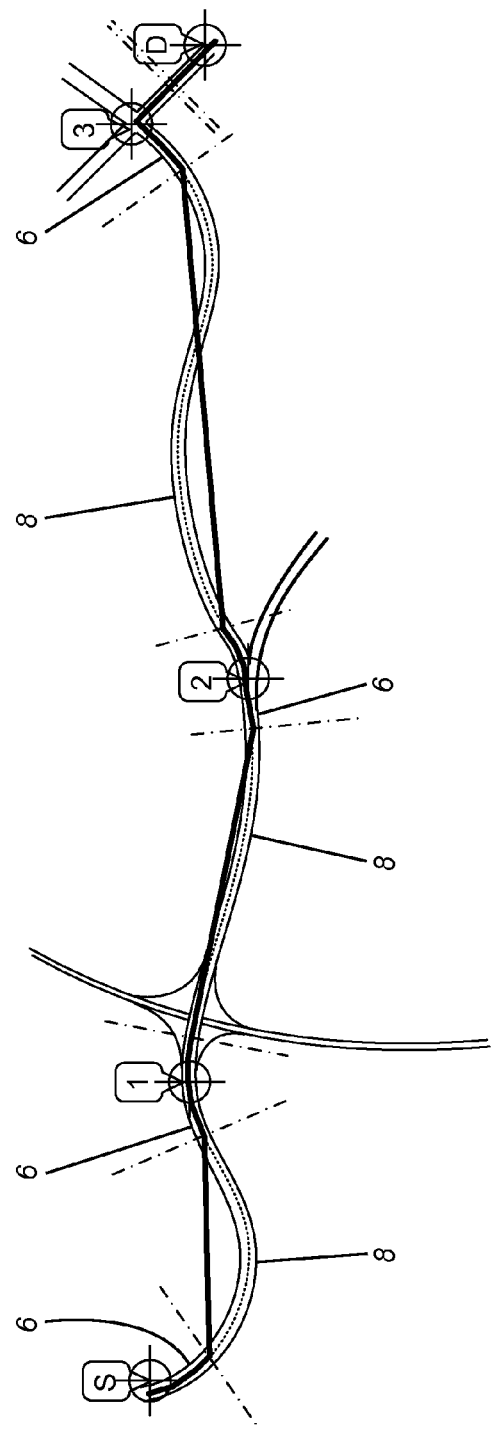

This arrangement enables the total number of waypoints of the path to be reduced, while at the same time preserving waypoints close to each of the critical points of the route, so that the path will accurately follow the actual route in the vicinity of each critical point of the route, as may be seen in FIG. 5b. Outside of the proximal segments 6 of the route, the path may deviate from the route, and the amount of deviation may tend to increase as the separation between critical points increases, as may also be seen in FIG. 5b. However, this is considered to be acceptable, because along these portions of the route, the user merely needs to follow a road they are currently on. As a result, the user does not need to rely on the path display for navigation, and errors in the path display will not cause serious problems. However, close to decision points and endpoints, where an accurate display of the path is very useful for navigation, the present technique ensures that the path display will properly trace the actual route on the map.

As may be appreciated, various methods may be used to provide preferential elimination of distal waypoints. In some embodiments, the route may be divided into legs, each of which extends between two adjacent critical points. In this case, waypoints may be eliminated from each leg of the route, starting at the mid-point of the leg and working progressively toward the decision-points at opposite ends of the leg. In a variation on this embodiment, each leg may be weighted according to its length, so that waypoints can be eliminated from the longest legs of the route first.

In the example of FIGS. 5a and 5b, the route is divided into respective proximal segments 6 associated with each critical point, and distal segments 8 spanning the gaps between adjacent proximal segments. The set of waypoints lying within the distal segments 8 can be identified as "distal waypoints", and processed to reduce the total number of waypoints of the path. Various methods may be used to process the distal waypoints, such as, for example: progressively eliminating waypoints starting at the mid-point of each leg of the route, as described above: executing a conventional route generalization algorithm, for example to minimize total path error; or simply deleting all of the distal waypoints. In either case, since processing is limited to the set of "distal waypoints", the "proximal waypoints" are preserved, and so the path accuracy in the vicinity of each critical point is retained.

Various methods may be used to define the proximal segments 6, or, equivalently, the set of proximal waypoints. In some embodiments, a predetermined number of waypoints (for example, 5) on each side of a critical point may be selected (i.e. the proximal segment is arranged symmetrically about the critical point). In other embodiments, waypoints lying within a predetermined distance (for example 1.6 km (1 mile)) of a critical point may be selected. If desired, the predetermined number (or distance) used to select the proximal waypoints may be different on each side of a critical point (i.e. the proximal segment is arranged asymmetrically about the critical point). Thus, for example, more waypoints may be selected on the near-side of a decision point, as compared to the far-side of the decision point. With this asymmetrical arrangement, the path will more accurately follow the route (or, alternatively, provide accurate route following over a greater distance) as the user approaches the decision point than after the user has passed the critical point.

Figure 6A:
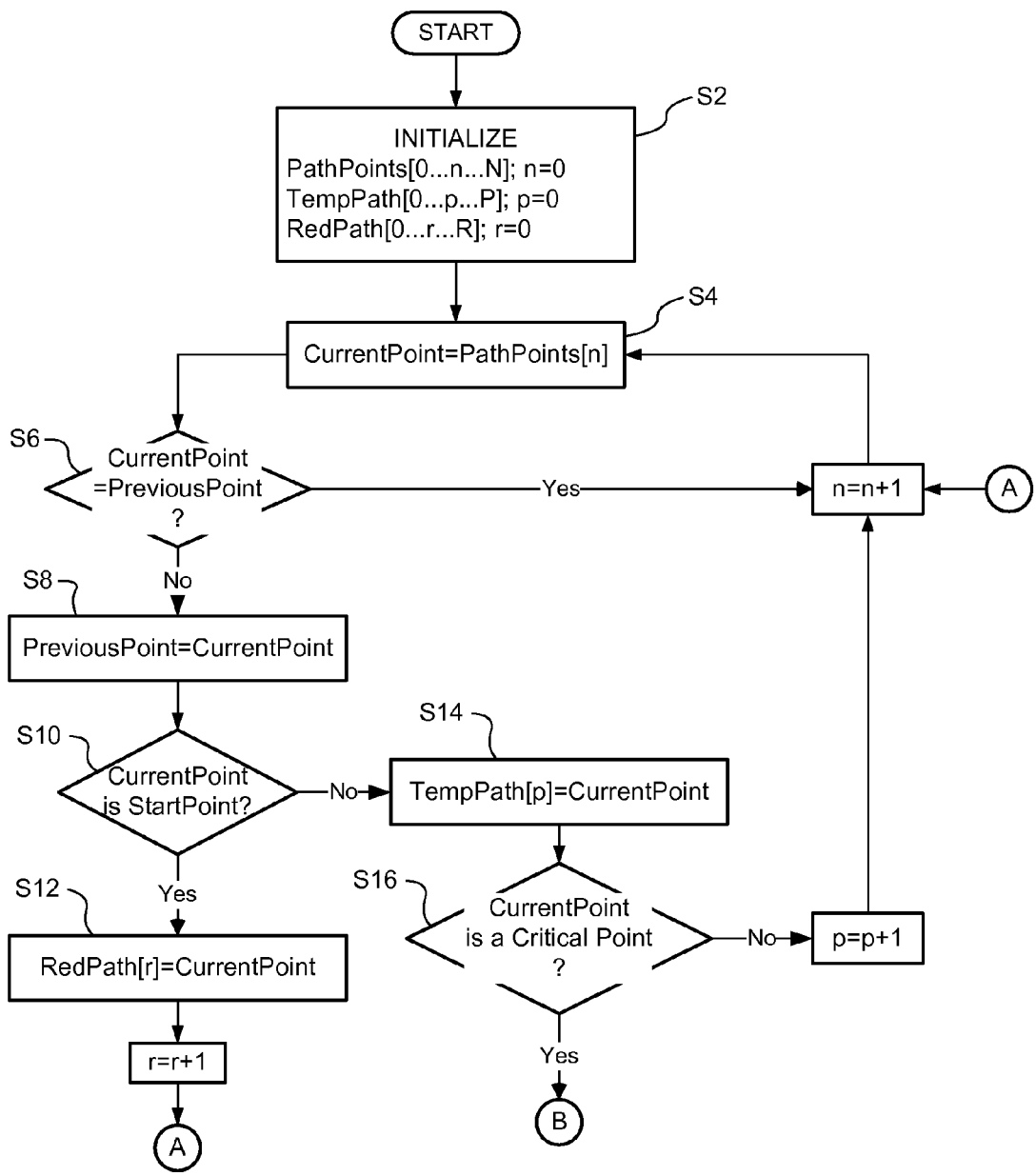
FIGS. 6a-c are flow charts showing a representative algorithm for computation of a reduced waypoint path according to an embodiment of the present technique.
Figure 6B:
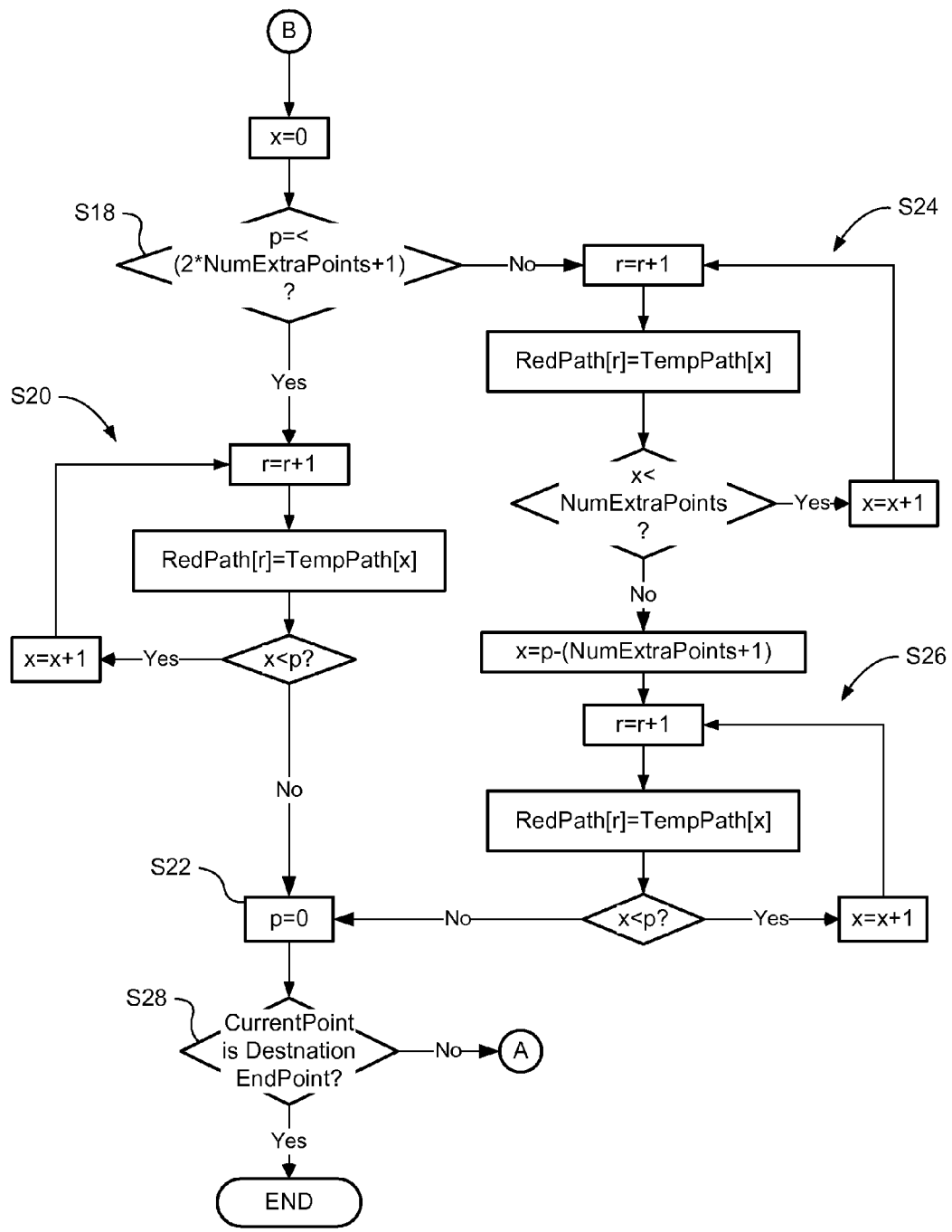

FIGS. 6a and 6b show a flowchart illustrating principal steps in a representative process for computing a reduced waypoint path composed of each critical point and including a predetermined number (NumExtraPoints) of proximal waypoints on both sides of each critical point. In the embodiment of FIGS. 6a and 6b, waypoints of an initial path are computed using known methods, and stored in an array called "PathPoints[ ]". The waypoints may conveniently be represented by latitude and longitude coordinates, and the set of waypoints stored in the array PathPoints[ ] will typically include both critical points and waypoints between each successive critical point. It is possible that the conventional path computation algorithms may produce duplicate waypoints, and the array pathPoints[ ] may include such duplicate waypoints. The illustrated algorithm processes the array pathPoints[ ] to eliminate duplicates, as well as identify the proximal waypoints that are needed to define the reduced waypoint path which, at the completion of the algorithm, will be stored in an array called "RedPath[ ]".

Referring to FIG. 6a, the algorithm starts with initializing the arrays (at S2), and setting respective index values of each array to 0. As noted above, the array pathPoints[ ] is preloaded with each of the waypoints computed for the route. The other arrays (TempPath[ ] and RedPath[ ]) can conveniently be set to initial values of 0.

A waypoint is extracted from the pathPoints[ ] array and assigned to a CurrentPoint variable (at S4), and checked to determine whether it is a duplicate (at S6). Clearly, for the first selected waypoint (i.e. n=0), this check must yield a result of "no", but for all successive waypoints (i.e. for n>0) this check enables elimination of duplicate waypoints. Thus, if a duplicate waypoint is found, the index "n" is incremented, and the next waypoint extracted from the pathPoints[ ] array and assigned to a CurrentPoint variable as described above.

If the CurrentPoint is not a duplicate, then the "previousPoint" value is updated to equal the CurrentPoint (at S8), and then the CurrentPoint is checked to determine if it is the StartPoint of the route (at S10). If the CurrentPoint is the StartPoint, then it is assigned to the reduced waypoint path array RedPath[ ] (at S12), and the next waypoint is selected (S4) from the PathPoints[ ] array for processing.

If the CurrentPoint is not the StartPoint, then it is loaded into the TempPath[ ] array (at S14), and checked (S16) to determine if it is a critical point of the route. As mentioned above, the "critical points" of the route include the endpoints (starting and destination points) as well as the decision points along the route. If the CurrentPoint is not a critical point, then the next waypoint is selected from the PathPoints[ ] array (S4) for processing as described above. The non-critical point need not be removed from the TempPath[ ] array; however, the non-critical point is not copied to the RedPath[ ] array. On the other hand, if the CurrentPoint is a critical point, then the TempPath[ ] array will contain the critical point (CurrentPoint) and all of the (non-duplicate) waypoints lying on the route between the previous critical point and the CurrentPoint. In this case, the relevant waypoints must be extracted from the TempPath[ ] array and added to the RedPath[ ] array.

Referring now to FIG. 6b, as an initial step, the TempPath index "p" is checked (at S18) to determine the number of waypoints stored in the TempPath[ ] array. If p≤2*NumExtraPoints+1, then all of the waypoints stored in the TempPath[ ] array must be added to the RedPath[ ] array. In the illustrated embodiment, this is accomplished by loading the waypoints TempPath[x=0 . . . p] into the appropriate fields of the RedPath[ ] array (at S20). At the completion of this operation, the TempPath index "p" is reset to zero (step S22) and, optionally, the values of TempPath[ ] array initialized to zero, in preparation for loading waypoints of the next leg of the route.

In many cases, the TempPath index "p" will be greater than 2*NumExtraPoints+1. In such cases, it is desired to load only the first and last NumExtraPoints from the TempPath[ ] array to the RedPath[ ] array. In the illustrated embodiment, this is accomplished by first loading the waypoints TempPath[x= 0 . . . (NumExtraPoints−1)] into the appropriate fields of the RedPath[ ] array (at S24); and then loading the waypoints TempPath[x=(p−(NumExtraPoints+1)) . . . p] into the appropriate fields of the RedPath[ ] array (at S26). At the completion of this operation, the TempPath index "p" is reset to zero (step S22) and, optionally, the values of TempPath[ ] array initialized to zero in preparation for loading waypoints of the next leg of the route. From the foregoing, it should be apparent that this method processes a number of points on each side of each critical point. These points could represent either a relatively short distance (e.g. in the case where the path is curved) or a relatively long distance (e.g. in the case where the path is straight). In a variant, though, the method could be modified to drop points that are not within a certain predetermined distance (e.g. 50 m, 100 m, etc.) of each critical point.

Once the appropriate waypoints have been loaded into the RedPath[ ] array from the TempPath[ ] array as described above, the CurrentPoint is checked (at S28) to determine if it is the destination endpoint of the route. If it is, then the algorithm terminates, and the RedPath[ ] array contains the complete reduced waypoint path. Otherwise, the next waypoint is selected from the PathPoints[ ] array (at S4), and processing continues as described above.

In the embodiment illustrated in FIGS. 6a and 6b, a number (NumExtraPoints) of points on both sides of each critical point are retained in the reduced waypoint path defined by the RedPath[ ] array. As may be seen in FIG. 6b, this will result in the reduced waypoint path being characterized by straight line segments extending through each distal segment 8 of the route. In most cases, this error will be tolerable. However, in some instances, the straight line may depart so far from the actual route that it creates confusion. This issue can be overcome by modifying the algorithm of FIGS. 6a and 6b to permit at least some of the distal waypoints to be retained.

Figure 6C:
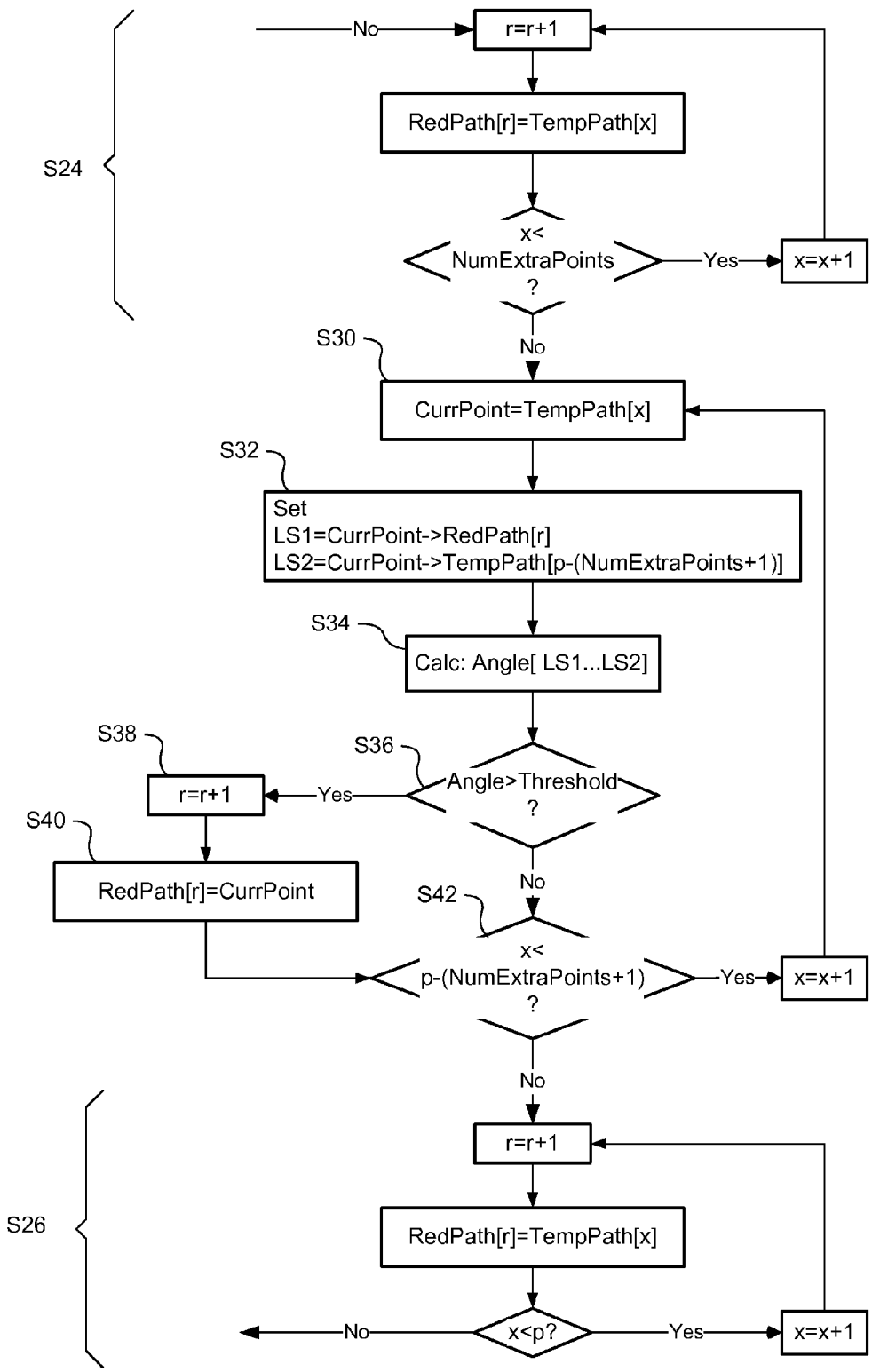

One method of accomplishing this is to limit the maximum permissible angle between line segments making up the reduced waypoint path. For example, FIG. 6c illustrates an embodiment in which the algorithm of FIGS. 6a and 6b is modified by the insertion, between steps S24 and S26, of a process for checking distal waypoints. In the illustration of FIG. 6c, all of the steps of FIGS. 6a and 6b, including step S24 operate as described above, and so will not be described again. At the completion of step S24, RedPath[r] contains the waypoint most recently added to the reduced waypoint path, which corresponds with the last "proximal waypoint" of the previous critical point of the route. The next nearest "proximal waypoint" is associated with the next critical point of the route, and is stored at TempPath[(p−(NumExtraPoints+1))]. With this arrangement, the waypoints stored at TempPath [x=x . . . (p−NumExtraPoints)] are distal waypoints, and it is desirable to eliminate as many of these points as possible, subject to a maximum angle limitation. Thus, at step S30 TempPath[x] is assigned to a temporary variable (CurrPoint). A first line segment LS1 is defined (Step S32) between CurrPoint and the most recently saved waypoint RedPath[r], and a second line segment LS2 is defined between CurrPoint and the next proximal waypoint at TempPath[x=(p−(NumExtraPoints+1))]. The angle between the two line segments is then calculated (at S34) and compared with a predetermined threshold (at S36), which may be selected as desired. If the angle exceeds the threshold, the index "r" is incremented (at S38) and CurrPoint is added into the reduced waypoint path at RedPath[r] (S40). If the angle is less than the threshold, the CurrPoint is discarded. This process continues until the next proximal waypoint at TempPath[x=(p−(NumExtraPoints+ 1))] is reached (at S42), after which processing continues with step S26 as described above.

From the flowchart presented in FIG. 6c, it should be understood that this method can (optionally) involve calculating an angle subtended by a first line segment of the path extending from a current distal waypoint and a previous waypoint of the path, and a second line segment of the path extending from the current distal waypoint and a first proximal waypoint associated with a next critical point of the path. Once the angle has been calculated, the calculated angle is compared to a predetermined threshold. If the calculated angle is greater than the predetermined threshold, then the current distal waypoint is added to the path.

As will be appreciated, the foregoing methods can be implemented as coded instructions in a computer program product. In other words, the computer program product is a computer-readable medium upon which software code is recorded to perform the foregoing steps when the computer program product is loaded into memory and executed on the microprocessor of the LBS server 246.

Alternatively, it is possible for the wireless communications device 100 to receive raw route or raw path data and to perform the path point reduction on the received data at the wireless device. This alternative approach is beneficial in a high-bandwidth mobile device that has a relatively low-speed processor.

In other words, the foregoing methods can also be implemented on a wireless communications device or any other mobile device that is capable of receiving routing data and depicting a navigation path along a route between starting and destination endpoints. This wireless communications device 100 has a radiofrequency transceiver 108 for receiving data comprising waypoints representing a path defined along a route between two endpoints, e.g. starting and destination points. The route includes a set of critical points including the starting and destination endpoints as well as any decision points of the route that are between the two endpoints.

The wireless communications device 100 further includes a processor 102 coupled to memory 104, 106 for processing the raw data received by eliminating one or waypoints of the path that are distal each critical point, while retaining waypoints that are proximal each critical point. The resulting path has a reduced number of points without sacrificing fidelity in the vicinity of each critical point. This novel technology optimizes the delivery of useful navigation information while minimizing the amount of data that must be communicated over the air to the wireless device.

Another aspect of this novel technology is a method of displaying a navigation path on a map displayed on a display 112 of a wireless communications device 100. The wireless communications device 100 communicates or sends a request for a navigation path, routing instructions or map data (that may include the navigation path request) to a map server or routing server. In reply, the wireless communications device 100 receives from the server a reduced point path representing the navigation path for a route between two endpoints, the route including a set of critical points including the endpoints and any decision points of the route intermediate the two endpoints, wherein the reduced point path is generated by eliminating one or more waypoints of the path that are distal each critical point while retaining waypoints that are proximal each critical point. Therefore, this represents a novel way of efficiently obtaining useful path data for displaying a path on a map on a wireless communications device.

In one particular variant of this implementation of the technology, the wireless communications device 100 can be configured to selectively enable this path-point reduction algorithm depending on a variety of factors (e.g. current wireless bandwidth usage) or based on user input. In other words, for example, the user can select to have full (complete) path-point data downloaded for the path or can request that the reduced path-point data be downloaded. This selection can be a setting in the map or navigation application. As another example, the path-point reduction algorithm can be automatically or intelligently activated and/or (for example) deactivated based on the level of wireless transmission activity (bandwidth usage) and/or based on the level of CPU usage of the processor onboard the wireless communications device.

This new technology has been described in terms of specific implementations and configurations which are intended to be exemplary only. The scope of the exclusive right sought by the Applicant is therefore intended to be limited solely by the appended claims.

The invention claimed is:

1. A method, performed by a processor, of reducing waypoints of a path, the method comprising:
    identifying a route between two endpoints;
    computing waypoints of the path representing the route;
    identifying a set of critical points including the two endpoints and a plurality of decision points intermediate the two endpoints, each of the plurality of decision points representing a junction or intersection of the route;
    dividing the path into proximal segments and distal segments, wherein each of the plurality of proximal segments comprises one critical point and one or more proximal waypoints that are proximal the critical point, and wherein each of the plurality of distal segments, which is intermediate two successive proximal segments, comprises a plurality of distal waypoints;
    determining one or more distal waypoints to be eliminated from the path; and
    eliminating the one or more of the distal waypoints from the path, while retaining the proximal waypoints.

2. The method as claimed in claim 1 wherein eliminating one or more of the distal waypoints of the path comprises:
    defining the route as a series of legs, each leg extending between a respective pair of adjacent critical points; and
    eliminating one or more of the distal waypoints of the path lying nearest a respective midpoint of each leg of the route.

3. The method as claimed in claim 2 further comprising:
    determining a length of each leg of the route; and
    determining a number of distal waypoints to be eliminated from each leg based on the length of the leg, wherein the number of distal waypoints eliminated from any one of the legs is proportional to the length of the leg.

4. The method as claimed in claim 1 wherein each proximal segment comprises either one of: a predetermined number of waypoints; and any waypoints lying within a predetermined distance from each critical point.

5. The method as claimed in claim 1 wherein eliminating one or more of the distal waypoints comprises deleting all of the distal waypoints.

6. The method as claimed in claim 1 wherein eliminating the one or more of the distal waypoints comprises, for each distal waypoint:
    calculating an angle subtended by a first line segment of the path extending from a current distal waypoint and a previous waypoint of the path, and a second line segment of the path extending from the current distal waypoint and a first proximal waypoint associated with a next critical point of the path;
    comparing the calculated angle to a predetermined threshold; and
    adding the current distal waypoint to the path when the calculated angle is greater than the predetermined threshold.

7. The method as claimed in claim 1 wherein each proximal segment that is a decision point is arranged symmetrically about the critical point.

8. The method as claimed in claim 1 wherein each proximal segment that is a decision point is arranged asymmetrically about the critical point.

9. The method as claimed in claim 8 wherein each proximal segment encompasses more waypoints on a near side of the critical point than on a far-side of the critical point, wherein the path accurately follows the route over a greater distance as the user approaches the critical point than after the user has passed the critical point.

10. A non-transitory computer-readable medium storing software instructions for controlling a computer for reducing waypoints of a path, by:
    identifying a route between two endpoints;
    computing waypoints of the path representing the route;
    identifying a set of critical points including the two endpoints and a plurality of decision points intermediate the two endpoints, each of the plurality of decision points representing a junction or intersection of the route;
    dividing a route the path into proximal segments and distal segments, wherein each of the plurality of proximal segments comprises one critical point and one or more proximal waypoints that are proximal the critical point and wherein each of the plurality of distal segments, which is intermediate two successive proximal segments, comprises a plurality of distal waypoints;
    determining one or more distal waypoints to be eliminated from the path; and
    eliminating the one or more of the distal waypoints of the path, while retaining the proximal waypoints.

11. The computer-readable medium as claimed in claim 10 wherein eliminating one or more of the distal waypoints of the path comprises:
    defining the route as a series of legs, each leg extending between a respective pair of adjacent critical points; and
    eliminating one or more of the distal waypoints of the path lying nearest a respective midpoint of each leg of the route.

12. The computer-readable medium as claimed in claim 11 further comprising software code for controlling the computer to:
    determine a length of each leg of the route; and
    determine a number of distal waypoints to be eliminated from each leg based on the length of the leg, wherein the number of distal waypoints eliminated from any one of the legs is proportional to the length of the leg.

13. The computer-readable medium as claimed in claim 11 wherein each proximal segment comprises either one of: a predetermined number of waypoints; and any waypoints lying within a predetermined distance from each critical point.

14. The computer-readable medium as claimed in claim 13 wherein eliminating one or more of the distal waypoints comprises:
 defining the route as a series of legs, each leg extending between a respective pair of adjacent critical points; and
 eliminating one or more of the distal waypoints lying nearest a respective midpoint of each leg.

15. The computer-readable medium as claimed in claim 13 wherein each proximal segment that is a decision point is arranged symmetrically about the critical point.

16. The computer-readable medium as claimed in claim 15 wherein each proximal segment encompasses more waypoints on a near side of the critical point than on a far-side of the critical point, wherein the path accurately follows the route over a greater distance as the user approaches the critical point than after the user has passed the critical point.

17. The computer-readable medium as claimed in claim 13 wherein each proximal segment that is a decision point is arranged asymmetrically about the critical point.

18. The computer-readable medium as claimed in claim 11 wherein eliminating one or more of the distal waypoints comprises deleting all of the distal waypoints.

19. A wireless communications device comprising:
 a radiofrequency transceiver for receiving route data for a route between two endpoints; and
 a processor coupled to memory for:
 computing waypoints of the path representing the route;
 identifying a set of critical points including the two endpoints and a plurality of decision points intermediate the two endpoints, each of the plurality of decision points representing a junction or intersection of the route;
 dividing the path into proximal segments and distal segments, wherein each proximal segment comprises one critical point and one or more proximal waypoints that are proximal the critical point and wherein each distal segment, which is intermediate two successive proximal segments, comprises plurality of distal waypoints, wherein the processor is configured to determine one or more distal waypoints to be eliminated from the path and to eliminate the one or more of the distal waypoints from the path, while retaining the proximal waypoints.

20. The wireless communications device as claimed in claim 19 wherein the processor eliminates the one or more distal waypoints by defining the route as a series of legs, each leg extending between a respective pair of adjacent critical points and eliminating one or more of the distal waypoints of the path lying nearest a respective midpoint of each leg of the route.

21. A method of displaying a navigation path on a map displayed on a display of a wireless communications device, the method comprising:
 sending a request for the navigation path from the wireless communications device to a server;
 receiving from the server at the wireless communications device a reduced point path representing the navigation path for a route between two endpoints, the route including a set of critical points including the endpoints and any decision points of the route intermediate the two endpoints, each of the decision points representing a junction or intersection, wherein the reduced point path is generated by:
 dividing the path into proximal segments and distal segments, wherein each proximal segment comprises one critical point and one or more proximal waypoints that are proximal the critical point and wherein each distal segment, which is intermediate two successive proximal segments, comprises a plurality of distal waypoints;
 determining one or more distal waypoints to be eliminated from the path;
 eliminating the one or more of the distal waypoints from the path while retaining the proximal waypoints; and
 displaying on the wireless communications device the navigation path based on the reduced point path.

22. The method as claimed in claim 21 wherein the reduced point path is generated by defining the route as a series of legs, each leg extending between a respective pair of adjacent critical points and eliminating one or more of the distal waypoints of the path lying nearest a respective midpoint of each leg of the route.

23. The method as claimed in claim 21 wherein the reduced point path is generated by defining at least one proximal segment that encompasses more waypoints on a near side of the critical point than on a far-side of the critical point, wherein the path accurately follows the route over a greater distance as the user approaches the critical point than after the user has passed the critical point.

* * * * *